United States Patent [19]

McReynolds et al.

[11] 3,986,259

[45] Oct. 19, 1976

[54] ROTARY BARK HACK

[75] Inventors: Robert D. McReynolds, Lake City; Donald R. Roberts, Brooker; Mozon T. Proveaux, Lake City; Junior Broomfield; Ernest R. Crews, both of Olustee; M. Tillman Richards, Jr., Lake Butler; Ralph W. Clements; William J. Peters, both of Lake City, all of Fla.

[73] Assignee: The United States of America as represented by the Secretary of Agriculture, Washington, D.C.

[22] Filed: Apr. 27, 1976

[21] Appl. No.: 680,642

[52] U.S. Cl. .................................... 30/121; 30/390; 144/222

[51] Int. Cl.² .................... B26B 25/00; A01G 23/10

[58] Field of Search .................. 30/121, 166 R, 373, 30/390; 47/12; 144/208 C, 222

[56] References Cited

UNITED STATES PATENTS

| | | | |
|---|---|---|---|
| 891,755 | 6/1908 | Westlund | 144/222 X |
| 2,792,670 | 5/1957 | Haynes | 30/121 X |
| 2,932,127 | 4/1960 | Prance | 30/121 X |
| 3,121,974 | 2/1964 | Brantley | 30/121 X |
| 3,123,111 | 3/1964 | Mattson | 30/390 |
| 3,513,888 | 5/1970 | Townsend | 30/390 |

*Primary Examiner*—Al Lawrence Smith
*Assistant Examiner*—J. C. Peters
*Attorney, Agent, or Firm*—M. Howard Silverstein; David G. McConnell

[57] ABSTRACT

This invention relates to an improved portable powered tool for removing bark from living pine trees preparatory to inducing oleoresin flow by known chemical means. This tool utilizes a lightweight, chainsaw-type engine to power a specially designed set of blades partially enclosed in a housing designed to provide multiple guides for producing the type cut necessary to properly prepare a tree for collection of naval stores and to provide a method for discharging debris away from the operator and work area.

4 Claims, 3 Drawing Figures

ROTARY BARK HACK

BACKGROUND OF THE INVENTION

Figure 1:
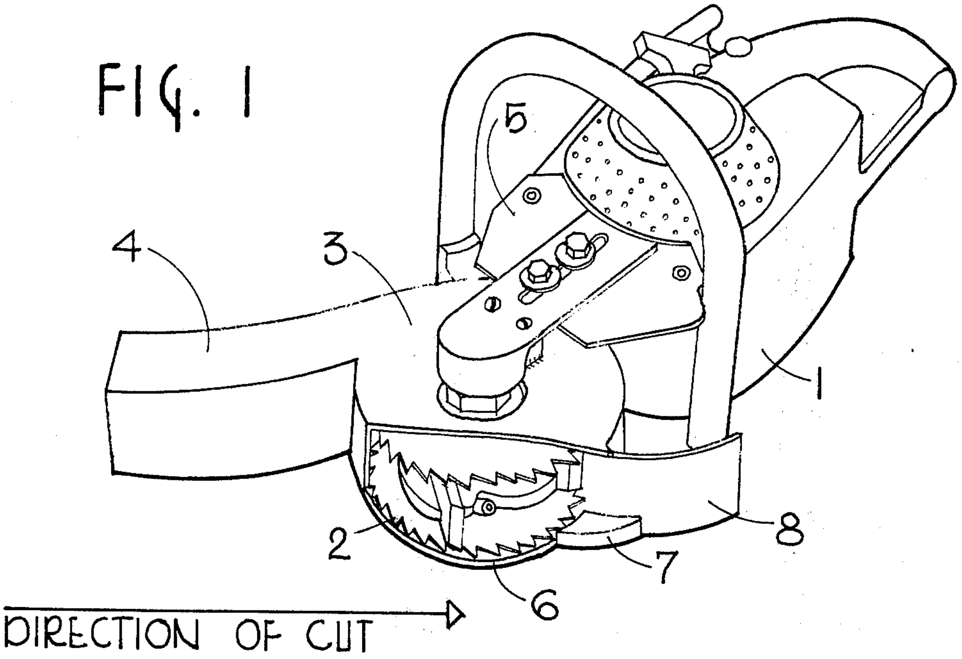
Figure 2:
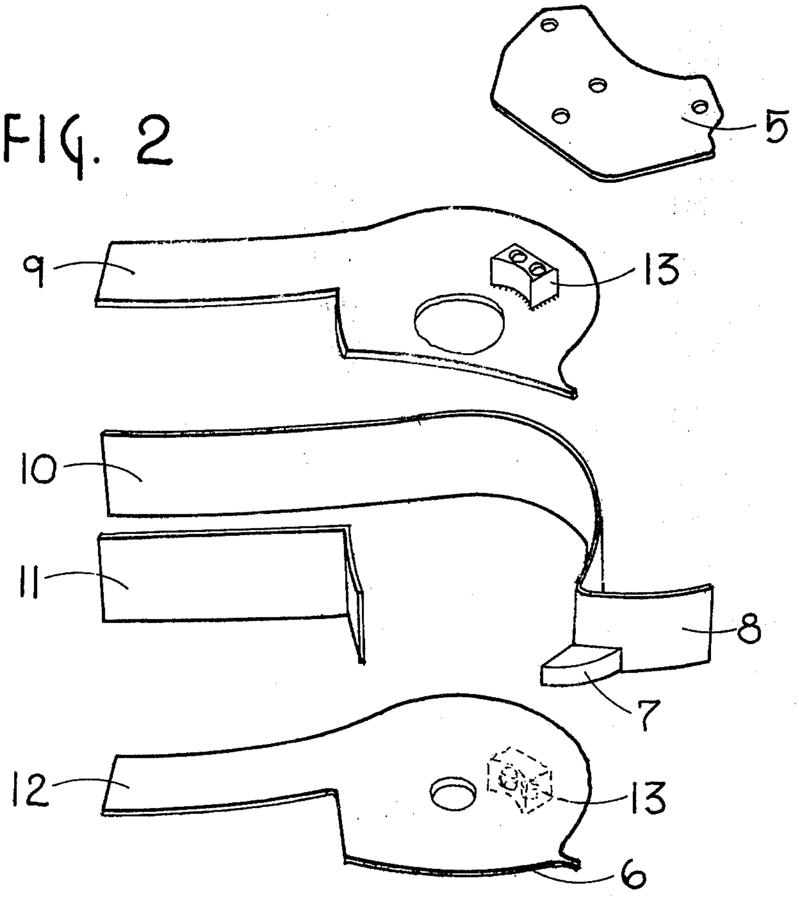
Figure 3:
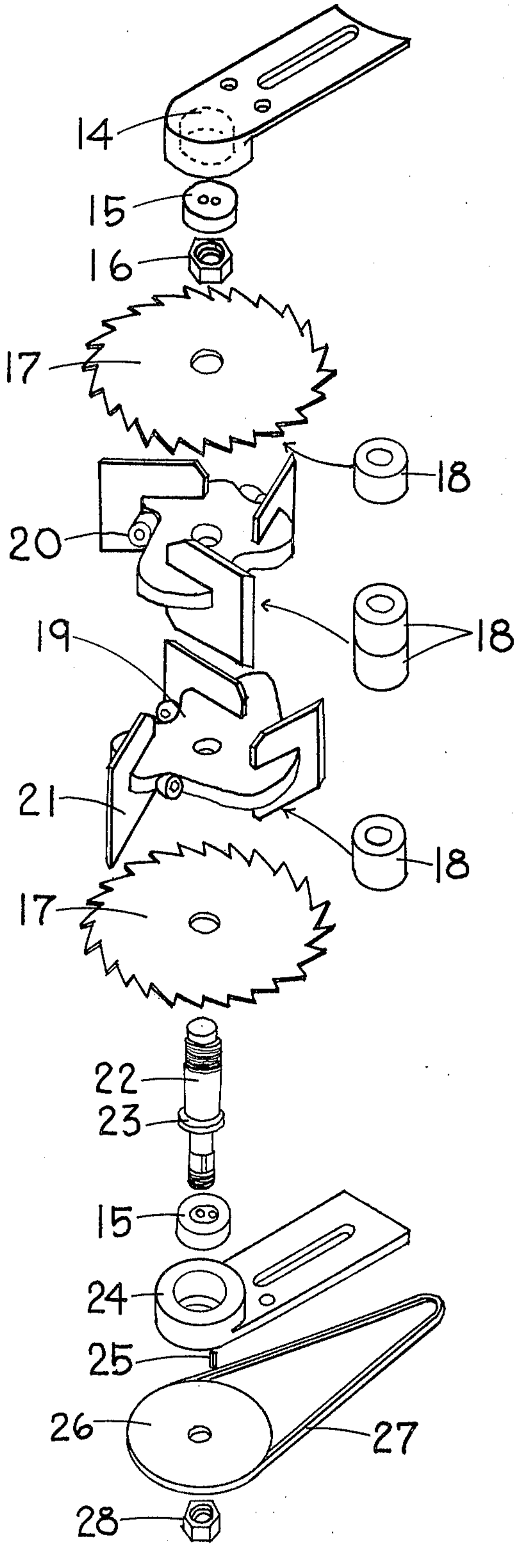

1. Field of the Invention:

This device is designed to provide an easier and more satisfactory method for removing a strip of bark of the proper size from a pine tree precedent to the use of chemicals by known means to induce pine gum flow. This powered tool eliminates problems that have been associated with manual and previous powered methods of preparing a proper wound.

2. Prior Art:

Pine gum (oleoresin) is a basic raw material yielding other products such as turpentine and rosin which are used in the manufacture of many products. Oleoresin is extracted from living pine trees by periodically wounding them and treating the wound with gum flow stimulants to prolong and increase the flow of gum. Such a wound is called a "face" and a face is created by applying a series of bark-removing cuts known as "streaks;" the process of making a streak is known as "chipping." The first streak is made low on the tree trunk near the ground and each successive streak is made directly above the preceding streak at intervals of 2 to 4 weeks during the period from March through October. The gum runs down the face to a collection apron and cup attached to the base of the tree. The face extends to a greater height each time a new streak is cut until it exceeds convenient working reach at which time a new face is begun on the opposite side of the tree to form a "back face."

Each individual streak is made by removing strips of bark 1 to 3 inches high and equal in length to approximately one-third of the circumference of the tree. Ideally, the bark is removed down to the wood surface without penetrating the wood surface. A sulphuric acid solution is then sprayed on the exposed wood to induce and prolong gum flow. A more recent method (patented in December, 1967) utilizes a streak 2 to 3 inches in height; a bead of specially formulated sulphuric acid paste is then applied to the right angle at the top of the streak between the freshly exposed wood and remaining bark. The acid stimulates flow for 2 to 4 weeks at which time a new streak is cut.

The traditional method of chipping is to manually pull a specially shaped blade (hack) across the face of the tree; this action removes a strip of bark 1 to 1 ½ inches high, but since a proper wound requires a height of 2 to 3 inches, at least two passes must be made to produce one suitable streak. A certain degree of skill is required to cut through all of the bark and not wound the living wood underneath. Because of the degree of skill and the physical effort required to make a proper wound by hand, various alternative methods have been devised.

One of these alternatives was a powered rotary chipper manufactured under the name "J. B. Power Chipper." This chipper was powered by a small gasoline engine. The blade was a solid circular disk with chainsaw teeth riveted to the circumference of the disk. A ¾-inch wide cut or streak was obtained by using spacers to offset some of the teeth. At the time this device was developed (1958), a ¾-inch wide streak was adequate to maximize the effectiveness of the chemical spray then being used to promote and prolong gum flow. However, current industry practice is to use an acid paste for gum flow stimulation, and this paste requires a streak 2 to 3 inches wide to maximize its effectiveness. Even if the "J. B. Power Chipper" were still being made, it would be very difficult to increase its effective cutting width to the dimension presently required. Additionally, this device had a marked tendency to bite into the wood, an extremely undesirable trait in itself, but this biting also caused the tool to kickback much as a carpentry bench saw does when put in a bind. The occasional gouging of the wood both increased the risk of infection to the tree as well as produced a very uneven surface over which gum had to flow.

A second, more recent device was issued U.S. Pat. No. 2,932,127 on Apr. 12, 1960. This device, patented by Prance and Sheffield, utilizes a back-mounted gasoline engine driving a remote rotary cutter through a flexible drive shaft. The cutter consisted of a circular disk from the circumference of which protruded four blades each shaped similarly to the blade used with a hand powered bark hack. An L-shaped rod which rode the uncut bark above the intended streak provided the only guide for cutting and also provided the only control for depth of cut. This device also cut a streak of approximately ¾-inches width, but unlike the "J. B. Power chipper," there was no provision for adjustment of streak width. The entire device weighed approximately 30 pounds.

A primary purpose of this invention is to provide a lighter, more readily portable, and more reliable powered bark hack than presently exists.

Another purpose is to provide a powered bark hack on which the width of cut may be readily and easily varied.

A further purpose is to provide a powered bark hack which requires minimal operator training and skill to produce work of satisfactory quality.

An additional purpose is to provide a powered rotary bark hack which produces a smooth, even cut of proper width and depth with a single pass across the tree face.

Still another purpose is to provide a powered rotary bark hack which conveys chips and debris away from the tree thus eliminating the need for the operator to carry a cover to protect the collection apron and cup from debris.

Additional purposes, features, and advantages will become apparent as the invention is described hereunder.

DESCRIPTION

In describing this invention, the following illustrations will be referred to, but they are intended only to illustrate a preferred embodiment of the invention, for as will be obvious, variations for other purposes and situations are possible while complying with the concept described.

FIG. I shows the complete assembled powered rotary bark hack;

FIG. II shows the cutter housing with multiple integral cutting guides and the integral discharge chute;

FIG. III shows the cutting assembly with its associated drive and mounting components.

As shown in FIG. I, the invention consists basically of a power source 1, a cutting assembly 2, and a cutter housing 3 which is designed to provide multiple cutting guides 6, 7, 8, a chip discharge chute 4, and operator protection from moving parts. A preferred power source is a modern lighweight chainsaw engine as shown in FIG. I. These engines are easily adaptable to the components used in the rotary bark hack, they are commonly used in wood operations so would be readily available, and they have the necessary power, high speed, portability, and reliability to be ideally suited for the purpose detailed herein. Additionally, adaptation of the engine to the bark hack application is relatively easy and simple while still allowing for equally easy conversion back to a bar and chain for other uses. While the modern chainsaw engine is a preferred embodiment, other power sources are equally applicable even if less convenient or portable; and example of a substitute used successfully is a 4500 r.p.m. pneumatic angle sander supplied with compressed air from a compressor on a vehicle accompanying the operator or from a compressed air tank carried by the operator. These two types of power source are merely illustrative of devices which have been used successfully and are not intended as an exclusive list of possible power sources for this invention.

FIG. II shows the cutter housing in an exploded view. Mounting plate 5 attaches to the engine 1 and serves as a base for attaching the cutting assembly 2 and cutter housing 3 to the top side of the engine. Side plates 9 and 12 form the upper and lower sides respectively of both the cutter housing 3 and the discharge chute 4. In addition, edge 6 of side plate 12 extends flush with the bottom saw blade on the cutting assembly 2 and serves as a cutting guide by riding on wood exposed by the previous streak; this guide helps control depth of cut and keeps the blade from cutting into the wood underneath the bark. Side plate 9 does not extend to the edge of the cutting assembly 2 to allow for blade penetration into the bark of the tree while cutting. Small blocks 13 are mounted on the outside of each side plate 9 and 12 in such a manner as to cant the engine at an angle of approximately 45° in the direction of movement while cutting.

Back plate 10 acts as the connecting portion of the cutter housing 3 and chip discharge chute 4 between side plates 9 and 12 on the inside of the cutter housing 3. Tongue 8 which is an extension of back plate 10 serves as a second cutting guide by riding the bark in front of the blade and thus giving the operator a means to keep the blade parallel to the wood by both sight and feel. A third cutting guide, wedge 7, is also attached to back plate 10. The top or inside edge of wedge 7 is in line with the cutting path of the lowest blade on the cutting assembly 2. This inside edge of wedge 7 hooks under or fits snugly against the angle between bare wood and bark surface left from the previous streak; this allows the operator by feel to utilize the full cutting width of the cutting assembly 2. Front plate 11 serves as the remaining or outside connection between side plates 9 and 12 to form the chip discharge chute 4.

FIG. III details the cutting assembly and the components for mounting the cutting assembly to the power source and for transmitting the power from the power source to the cutting assembly. The cutting assembly itself is composed of two overlapping molding cutter heads 19 each containing three planer blades 21 secured to the cutter heads 19 by retaining bolts 20 which cutter heads 19 are mounted on a shaft 22 between a pair of circular saw blades 17 of such matching diameter that the cutting edge of the planer blades 21 extends approximately flush with the circumference of the circular saw blades 17. Spacers 18 are placed between each cutter head 19 and the adjacent circular saw blade 17 and between the two cutter heads 19; the width of cut of the cutting assembly is varied by changing the arrangement of the spacers between the various blades: addition of spacers between the cutter heads 19 increases the width of cut and removal of spacers between the cutter heads 19 decreases the width of cut. The blade assembly is held stationary relative to the shaft 22 between a shoulder 23 on the shaft 22 and a nut 16 which is attached to the shaft 22 by threads. The shaft 22 is supported on either end in mounting brackets 14 and 25 by bearings 15. Power is transmitted from the power source to the shaft 22 by a belt 27 which drives a pulley 26 secured to the shaft 22 by a key 25 and nut 28.

The powered rotary bark hack is assembled by attaching mounting plate 5 to the engine 1. Mounting bracket 14 is attached to mounting plate 5. A bearing 15 is fitted into mounting bracket 14, and the circular saw blades 17 and cutter heads 19 with planer blades 21 and desired number of spacers 18 secured to the shaft 22 as described above with cutting edges in the direction indicated in FIG. III. Side plate 9 is attached to mounting bracket 14 utilizing block 13. The end of the shaft 22 is then passed through the hole in side plate 9 into the bearing 15 in mounting bracket 14. Side plate 12 is then positioned with the shaft 22 extending through the hole in side plate 22 and the remaining bearing 15 and mounting bracket 24 are fitted over the end of the shaft 22 with the shaft 22 passing through the hole in the mounting bracket 24. The mounting bracket 24 is then attached to the engine 1 housing using the two bolts with which the chain bar is ordinarily attached. The remaining cutter housing members, back plate 10 and front plate 11, are properly positioned between side plates 9 and 12 and secured in place by securing side plate 12 to mounting bracket 24 utilizing block 13 on side plate 12. The shaft drive pulley 26 is then secured to the shaft 22 with the key 25 and nut 28. With the bolts attaching mounting bracket 24 to the engine 1 and mounting bracket 14 to mounting plate 5 loose, the entire assembly is moved away from the engine 1 until adequate tension in belt 27 is obtained; the bolts attaching both mounting brackets 14 and 24 are then secured. A belt-type pulley for the engine drive shaft can be obtained from the engine manufacturer for use with a drive belt as used on the rotary bark hack.

In operation, the engine is prepared for operation in accordance with the instructions of the manufacturer. When the engine 1 is accelerated, its centrifugal clutch engages, thus driving the cutting assembly 2 through the belt 27. With the cutting assembly 2 turning, the rotary bark hack is placed against the face of the tree with the wedge guide 7 snugged against the shoulder or angle produced by the intersection of the previous streak and the uncut bark, edge guide 6 contacting the wood from the previous streak, and the flat surface of tongue 8 parallel to the uncut bark of the tree. Maintaining these relative positions, the rotary bark hack is moved from right to left across the face of the tree until the desired length streak has been obtained. The rotary bark hack is then removed from the tree and a bead of sulphuric acid paste is placed in the fresh-cut angle between bark and wood. The design of the cutter housing 3 and the discharge chute 4 together with the fanning action of the spinning blades effectively propels the debris created by the cutting operation through the discharge chute and away from the operator and the collection cup at the bottom of the tree. This is an important advantage over conventional hand chipping or other powered chippers since the operator need not concern himself with protecting the collection cup from debris as he must when using other bark hacks.

Other advantages of the rotary bark hack described herein over other methods or devices are important. The rotary bark hack has a cutting width which is readily adjustable while the powered hack of Prance and Sheffield is not adjustable at all, and as noted earlier, the width of cut of that device is unacceptably narrow for current industry use of acid paste; thus while two or more passes would be required with the Prance and Sheffield hack to form one streak on a tree, the rotary bark hack described herein will make the proper cut in one pass. Similarly, while the "J. B. Power Chipper" has a semi-adjustable blade, expansion to the required width would be very difficult and would result in an even more ragged and uneven cut then the "J. B. Power Chipper" produces with its normal narrow cut.

Quality of cut is another advantage of the rotary bark hack over the Prance and Sheffield device and the "J. B. Power Chipper." Both of these devices produce a much rougher surface on the cut than is produced by the rotary bark hack. Such smoothness is a decided advantage as a rough streak surface tends to retard and reduce the flow of gum down the tree face to the collection cup. An additional problem with prior designs was their tendency to dig into the wood of the tree which is most undesirable. Both of the designs mentioned above suffered from this defect and in addition, the "J. B. Power Chipper" had a strong kickback against the operator when one of its small cutting teeth dug into the wood; this kickback made operation difficult and unpleasant as well as reducing the accuracy with which a cut could be made. The rotary bark hack is designed with blades which give a smooth cut with minimal tendency to bite into the wood and no kickback. Additionally, its unique three-way guide system permits uniform cuts of the proper depth and width to be made with little effort. This contrasts with the previous devices which, if they had any cutting guides at all, only controlled depth of cut with no provision for keeping the saw parallel to the tree face as tongue 8 does or for maximizing the width of cut as wedge 7 does.

Another advantage of the rotary bark hack over the "J. B. Power Chipper" is a discharge chute and fanning blades to direct debris away from the operator and collection cup.

Other advantages of the rotary bark hack over the Prance and Sheffield device are that the rotary bark hack has less than half the weight of the previous device and is much more portable and readily usable in wooded and tangled areas since there are no bulky drive shafts to contend with. Additionally, the absence of a cumbersome backpack enhances operator movement in the field. Finally, the rotary bark hack has no acid sprayer to corrode metal parts as does the Prance and Sheffield device.

While the rotary bark hack is designed primarily for preparing trees for collection of naval stores, it has other uses as well. Nonexclusive examples of other uses include exposing the wood of conifers preparatory to treatment with chemicals to induce light-wood formation and girdling trees of unwanted species competing with crop trees in timber stand improvement work.

The chipping process is one of the most time consuming and physically demanding tasks associated with the naval stores industry. Widespread use of the powered rotary bark hack would present a chipping method that would eliminate much of the physical effort now required thus encouraging present workers to remain in the naval stores industry and new workers to join the industry. This is one of the basic advantage of any powered device, but since the powered rotary bark hack described herein is lighter, more portable, and provides more cutting guides to the operator than other powered devices, it is a distinct advance in powered chipping devices.

Having described our invention, we claim:

1. A powered rotary bark hack consisting of a cutting assembly for the purpose of removing all exterior surfaces of a tree to a point adjacent to the exterior wood surface of said tree, means for mounting said cutting assembly on a portable power source and means for transmitting power from said power source in such a manner as to drive the cutting assembly with a rotary motion, on which power source is mounted a cutter housing assembly which cutter housing assembly partially encloses said cutting assembly and which cutter housing assembly provides operator protection from moving parts, multiple cutting guides which regulate width of cut, depth of cut, and angular relation of plane of cut to wood surface, and a chip discharge means for directing debris generated in the cutting process away from the operator and tree.

2. The powered rotary bark hack defined in claim 1, in which the cutting assembly is composed of a first plurality of single-edged blades secured by a plurality of cutter heads which cutter heads are secured in parallel on a shaft between a second plurality of multiple-edged blades which parallel configuration creates an overlapping of the single-edged blades, which shaft is supported in mounting brackets attached to the power source, and which shaft is activated in angular motion about its principal axis by a pulley secured to the shaft, which pulley is driven by a connecting means between the pulley and power source.

3. The powered rotary bark hack defined in claim 1, in which the power source is a portable device capable of developing sufficient torque and angular velocity to adequately activate the cutting assembly for the purpose stated in claim 1.

4. The powered rotary bark hack defined in claim 2; in which the power source is a lightweight internal combustion engine such as typically used to provide power for chainsaws.

* * * * *